(12) United States Patent
Siegel et al.

(10) Patent No.: US 8,235,206 B2
(45) Date of Patent: Aug. 7, 2012

(54) COMBINATION GARMENT BAG, HAMPER, AND DUFFLE BAG

(76) Inventors: Rick Siegel, Los Angeles, CA (US); Jennifer Nigrosh, Los Angeles, CA (US)

(*) Notice: Subject to any disclaimer, the term of this patent is extended or adjusted under 35 U.S.C. 154(b) by 309 days.

(21) Appl. No.: 12/428,413

(22) Filed: Apr. 22, 2009

(65) Prior Publication Data
US 2010/0224515 A1    Sep. 9, 2010

Related U.S. Application Data

(60) Provisional application No. 61/088,685, filed on Aug. 13, 2008.

(51) Int. Cl.
*B65D 85/18* (2006.01)

(52) U.S. Cl. ............... 206/279; 206/286; 383/4; 383/6; 224/580

(58) Field of Classification Search .......... 206/281, 206/286; 383/4, 6; 224/580
See application file for complete search history.

(56) References Cited

U.S. PATENT DOCUMENTS

| | | | | |
|---|---|---|---|---|
| 1,930,043 A * | 10/1933 | Evens | ............... | 206/287 |
| 2,997,167 A * | 8/1961 | Westfall, Jr. | ............... | 206/287 |
| 3,115,959 A * | 12/1963 | Jaffe | ............... | 206/287.1 |
| 3,369,584 A * | 2/1968 | Faccio et al. | ............... | 383/61.4 |
| 3,776,372 A * | 12/1973 | Lemelson | ............... | 206/287 |
| 3,831,740 A * | 8/1974 | Pendergast et al. | ............... | 206/287 |
| 4,067,066 A * | 1/1978 | Bruno | ............... | 2/105 |
| 4,189,036 A * | 2/1980 | Pelavin | ............... | 206/278 |
| 4,189,039 A * | 2/1980 | Johnson | ............... | 192/26 |
| 4,502,576 A * | 3/1985 | Reardon | ............... | 190/18 R |
| 4,542,824 A * | 9/1985 | Allen | ............... | 206/287.1 |
| 4,549,748 A * | 10/1985 | Haley, Sr. | ............... | 280/641 |
| 4,817,791 A * | 4/1989 | Adams | ............... | 206/287.1 |
| 4,923,745 A * | 5/1990 | Wolfert et al. | ............... | 428/35.4 |
| 5,050,998 A * | 9/1991 | Wachtel | ............... | 383/6 |
| 5,090,559 A * | 2/1992 | Gendreau | ............... | 206/278 |
| D383,904 S * | 9/1997 | Stewart | ............... | D3/293 |
| 6,193,034 B1 * | 2/2001 | Fournier | ............... | 190/107 |
| D487,346 S * | 3/2004 | Geisler | ............... | D3/301 |
| 2002/0074199 A1 * | 6/2002 | Albritton | ............... | 190/107 |
| 2010/0006459 A1 * | 1/2010 | Foley | ............... | 206/279 |

* cited by examiner

*Primary Examiner* — Tri Mai
(74) *Attorney, Agent, or Firm* — QuickPatents, Inc.; Kevin Prince

(57) ABSTRACT

The present device is a reusable bag for laundry and laundry hangers. The reusable bag includes an enclosure made from a flexible web material having an open end and a closed end. The open end has a closure means, while the closed end includes an aperture adapted to receive a portion of each laundry hanger therethrough. With the open end of the enclosure facing upward in a hamper configuration, dirty laundry may be collected and, when the bag is full, the open end of the enclosure may be selectively closed with the closure means. The reusable bag may be transported to a laundry cleaning facility by carrying with a handle strap, and returned with clean laundry hanging on the laundry hangers inside the enclosure. The closed end of the enclosure may be facing upward in a garment bag configuration for protecting the clean laundry.

18 Claims, 2 Drawing Sheets

COMBINATION GARMENT BAG, HAMPER, AND DUFFLE BAG

CROSS-REFERENCE TO RELATED APPLICATIONS

This application claims the benefit of U.S. Provisional Patent Application 61/088,685, filed on Aug. 13, 2008, and incorporated herein by reference.

STATEMENT REGARDING FEDERALLY SPONSORED RESEARCH AND DEVELOPMENT

Not Applicable.

FIELD OF THE INVENTION

This invention relates to garment bags, and more particularly to an environmentally-friendly reusable combination garment bag, hamper, and duffle bag.

DISCUSSION OF RELATED ART

A wide variety of storage containers are used for the transportation of laundry. After clothes are worn, they are conventionally stored loosely with other unclean clothes in laundry baskets, duffle bags, hampers, and the like. Dirty laundry conventionally may be removed from such storage containers to be cleaned by professional cleaners, such as dry cleaning services, Laundromats, and the like. After the clothes are cleaned, they may be pressed and returned to a customer in one or more different, generally disposable bags. Such disposable bags are generally made of non-biodegradable materials and may be discarded by the customer after receiving the clothes, thereby taking up space in landfills and posing an environmental hazard, particularly to wildlife. Furthermore, in the conventional case, the customer must generally take the time to remove unclean clothes from the storage container before delivering them to the professional cleaner, which in addition to being time consuming may create a risk of the clothes not being cleaned (e.g., by dropping the clothes before taking them to the professional cleaner) or losing clothes at the professional cleaner's location.

Furthermore, clean clothes may be transported in garment bags in order to keep the clothes pressed and clean. A customer of a professional cleaner generally must remove the clean clothes from the disposable bag provided by the professional cleaner and place them in a separate garment bag to be transported. The process of transferring the clean clothes to the garment bag may be time-consuming, however, and may involve taking the risk of making the clean clothes dirty if a user is careless.

Reusable bags for transporting clothing are known in the art. For example, U.S. Pat. No. 5,090,559 to Gendreau filed on Nov. 19, 1990 describes a reusable carrier bag for dry cleaning that is seemingly convertible between a duffle bag-like orientation for collecting and carrying dirty clothing and a reusable dry cleaner bag orientation for returning cleaned clothing to customers. However, the carrier bag uses the same compartment to hold dirty and clean laundry. Because dirt from dirty laundry may accumulate on the walls of the compartment, the dirt may subsequently attach to clean clothes, therefore requiring disposable bags to maintain cleanliness of clean laundry. Additionally, such a carrier bag may awkward to transport, because there is no practical way for a user to carry the carrier bag except by lifting the carrier bag from the bottom or carrying the carrier bag from the draw string. Carrying the carrier bag, especially when the interior compartment is full of dirty laundry, may be uncomfortable and/or difficult for the user.

Therefore, there is a need for a reusable storage bag that may be used to store and transport loose dirty clothes, that may also be used to provide protection for clean clothes from dirt and substantially maintain the clean clothes in a pressed state. The reusable storage bag would advantageously prevent clean clothes from coming into contact with dirt from dirty clothes. Such a reusable storage bag could also be transported by a user without having the user carry the reusable storage bag awkwardly carry the storage bag from the bottom of the bag (which may require both of the user's hands) or from the top (which may eventually lead to tearing in the walls of the bag if enough weight is present within the bag). The present invention accomplishes these objectives.

SUMMARY OF THE INVENTION

The present device is a reusable bag for laundry and laundry hangers. The reusable bag includes an enclosure made from a flexible web material having an open end and a closed end. The open end has a closure means, while the closed end includes an aperture adapted to receive a portion of each laundry hanger therethrough. The enclosure also includes an inside surface and an outside surface. The reusable bag also includes at least one handle strap for facilitating carrying of the bag.

With the open end of the enclosure facing upward in a hamper configuration, dirty laundry may be collected and, when the bag is full, the open end of the enclosure may be selectively closed with the closure means. The reusable bag may be transported to a laundry cleaning facility by carrying with the at least one handle strap, and returned with clean laundry hanging on the laundry hangers inside the enclosure, with each hanger traversing the aperture in the closed end of the enclosure. The closed end of the enclosure may be facing upward in a garment bag configuration for protecting the clean laundry.

In an exemplary embodiment, the enclosure includes a front sheet of the flexible web material, a back sheet of the flexible web material, and a gusset sheet of the flexible web material. A peripheral edge of the gusset sheet is sewn at least partially to each of the front and back sheets to form the enclosure, and the gusset sheet forms a peripheral edge thereof. Furthermore, in an exemplary embodiment, the enclosure may be divided into a dirty laundry compartment and a clean laundry compartment by a central sheet of the flexible web material sewn to the gusset sheet. The dirty laundry compartment may include the hem and the closure means, while the clean laundry compartment may be closed at both ends and may include a zipper in the peripheral edge thereof adapted to facilitate insertion of clean laundry into the clean laundry enclosure when the bag is in the garment bag configuration.

The present invention is a reusable storage bag that may be used to store and transport loose dirty clothes that may also be used to provide protection for clean clothes from dirt and substantially maintain the clean clothes in a pressed state. The reusable storage bag may advantageously prevent clean clothes from coming into contact with dirt from dirty clothes. The reusable storage bag may also be transported by a user without having the user carry the reusable storage bag awkwardly carry the storage bag from the bottom of the bag or from the top of the bag. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
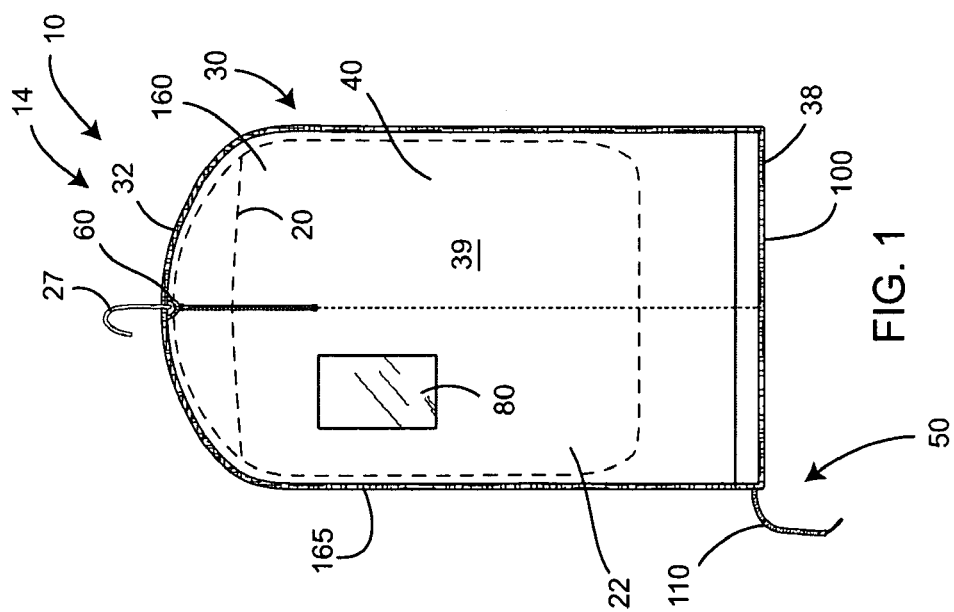
FIG. 1 is a front view of an exemplary embodiment of a reusable bag for laundry and laundry hangers in garment bag configuration.

FIG. 1 is a front view of an exemplary embodiment of a reusable bag 10 for laundry 20 and laundry hangers 25 in a garment bag configuration 14. Garment bag configuration 14 in the exemplary embodiment refers generally to a substantially pliable travel bag configuration, which may hang straight or fold double, and that may be used to carry suits, dresses, coats, or the like substantially without crushing or wrinkling thereof. The reusable bag 10 includes an enclosure 30 made from a flexible web material 40, which may be any suitable flexible fabric, such as cotton, linen and polyester, or nylon, for example. The enclosure 30 may take any suitable shape for containing pressed clothing.

In an exemplary embodiment, the enclosure 30 may include a front sheet 160 of the flexible web material 40 and a back sheet 170 (FIG. 2) of the flexible web material 40. Each sheet 160,170 may be at least partially sewn together along a peripheral edges 165,175 thereof. The flexible web material 40 in some embodiments may be a water resistant, air permeable material, such as nylon, for example.

The enclosure 30 has an open end 38 and a closed end 32. The open end 38 includes a closure means 50, which may be any structure that may substantially prevent clothes from falling out of the open end 38 (e.g., a zipper, snap buttons, hook-and-loop fasteners, etc.). As shown in the exemplary embodiment of FIG. 1, the closure means 50 may include a hem 100 around the open end 38 of the enclosure 30 through which a selectively cinchable drawstring 110 is slidably enclosed. The closed end 32 of the enclosure 30 includes an aperture 60 adapted to receive a portion 27 of each laundry hanger 25 therethrough (e.g., the hook portion 27 of the laundry hanger, or similar protruding portion used to hang the clothing). The enclosure 30 also includes an inside surface 37 (shown in FIG. 4) and an outside surface 39.

Figure 2:
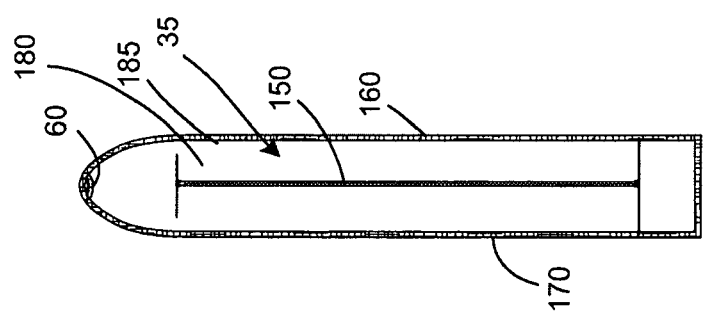
FIG. 2 is a side view of the invention in garment bag configuration.

FIG. 2 is a side view of the invention in garment bag configuration 14. While no laundry hangers 25 are shown in FIG. 2, the aperture 60 adapted to receive a portion 27 of each laundry hanger 25 therethrough is shown at the closed end 32 of the reusable bag 10, thereby indicating that the bag 10 is in the garment bag configuration 14. In the exemplary embodiment shown in FIG. 2, the enclosure 30 of the reusable bag 10 includes a front sheet 160 of the flexible web material 40, a back sheet 170 of the flexible web material 40, and a pair of gusset sheets 180 of the flexible web material 40. As shown in FIG. 2, a peripheral edge 185 of each gusset sheet 180 may be sewn at least partially to each of the front and back sheets 160,170 to form the enclosure 30, the gusset sheet 180 forming a peripheral edge 35 thereof. The gusset sheet 180 advantageously allows the reusable bag 10 to contain more laundry hangers 25, and therefore more clean laundry 22 than if the peripheral edges 165,175 of the front and back sheets were directly attached to one another.

Also, in an exemplary embodiment, at least one of the gusset sheets 180 may include a zipper 150 adapted to facilitate insertion of clean laundry 22 into the enclosure 30 when the bag 10 is in the garment bag configuration 14. By opening the zipper 150, a user may insert clean laundry 22 into the enclosure 30 through the peripheral edge portion 35 instead of from the open end 38 as is done conventionally. Allowing the user to access the enclosure 30 to insert clean laundry from the peripheral edge portion 35 is advantageous because it is difficult and time consuming to insert clean laundry 22 from the open end 38 without wrinkling same (e.g., the user may have difficulty placing a portion 27 of each laundry hanger through the aperture 60 when inserting from the open end 38 because of the presence of clean laundry items in the enclosure 30).

Figure 3:
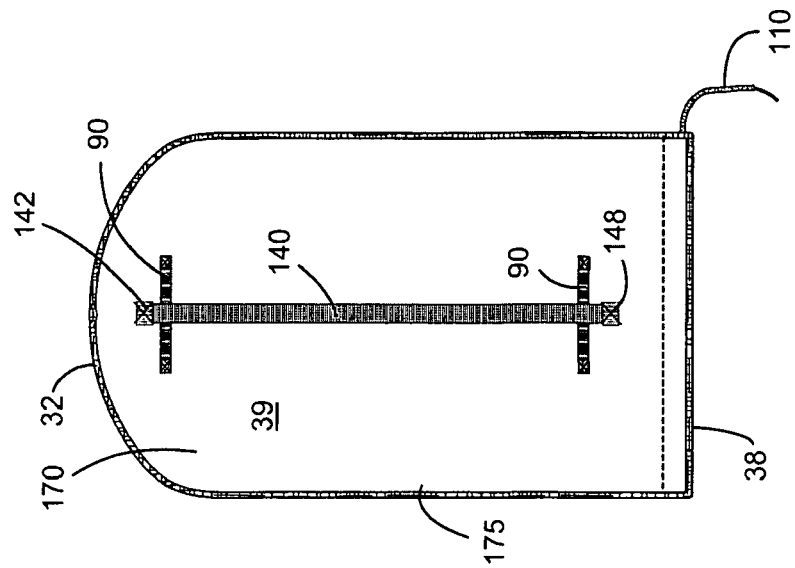
FIG. 3 is rear view of the invention in garment bag configuration.

FIG. 3 is a rear view of the invention in the garment bag configuration 14. As shown in FIG. 3, reusable bag 10 also includes at least one handle strap 90 for facilitating carrying of the bag 10. In the embodiment shown in FIG. 3, both handle straps 90 are shown on the back sheet 170 of the reusable bag 10, but at least one handle strap 90 may be located on the front sheet 160, a gusset sheet 180, and/or on a peripheral edges 165 or 175 in other embodiments. As shown in FIG. 3, in an exemplary embodiment, the at least one handle strap 90 may include a pair of handle straps 90, one each proximate the closed and open ends 32 and 38, respectively, of the enclosure 30.

Also, in an exemplary embodiment the at least one handle strap 90 may further include a shoulder strap 140 fixed at one end 142 to the outside surface 39 of the bag 10 proximate the closed end 32 of the enclosure 30 and at another end 148 to the outside surface 39 of the bag 10 proximate the open end 38 of the enclosure 30. The shoulder strap 140 is advantageous because the shoulder strap 140 facilitates transportation of the reusable bag 10 when it is full of dirty laundry 21, such as when it may otherwise be difficult for the user to carry the reusable bag 10. In an alternate embodiment, the at least one handle strap 90 may further include a V-shaped shoulder strap (not shown) fixed at three points to the outside surface 39 of the bag 10, and suitable for engaging both shoulders of a person for carrying the bag 10 as in a back-pack configuration.

Figure 4:
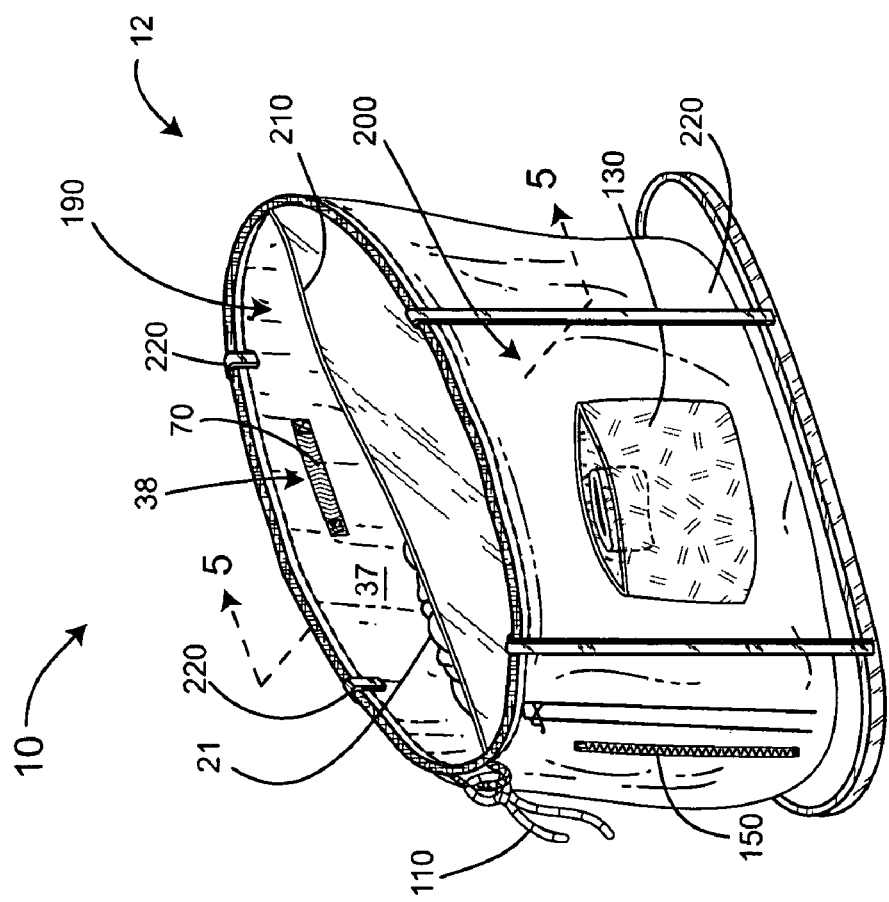
FIG. 4 is a perspective view of the invention in use as a hamper in an exemplary embodiment that includes a hamper frame.

FIG. 4 is a perspective view of the invention in use as a hamper in an exemplary embodiment that may include a hamper frame 220. Reusable bag 10 is shown in FIG. 4 to be in a hamper configuration 12, in which the reusable bag 10 takes the form of a receptacle to receive the dirty laundry 21. As shown in FIG. 4, with the open end 38 of the enclosure 30 oriented upward in the hamper configuration 12, dirty laundry 21 may be collected therein. When the bag 10 is full, the open end 38 of the enclosure 30 may be selectively closed with the closure means 50 (e.g., selectively cinchable drawstring 110 in the exemplary embodiment) and transported to a laundry cleaning facility by carrying with the at least one handle strap 90 or the shoulder strap 140.

As shown in the exemplary embodiment in FIG. 4, the reusable bag 10 may also include a laundry hanger retaining means 70 fixed to the inside surface 37 of the enclosure 30. The laundry hanger retaining means 70 may be any apparatus that may prevent laundry hangers 25 from being loose within the enclosure 30, such as a strap made of the flexible web material 40 and fixed at either end thereof to the inside surface 39 of the enclosure 30, a clip (not shown), or a pocket (not shown), for example. The laundry hanger retaining means 70 may permit the user to transport laundry hangers 25 to the laundry cleaning facility, thereby reducing or eliminating the need for the laundry cleaning facility to provide hangers 25 with the clean laundry 22.

Figure 5:
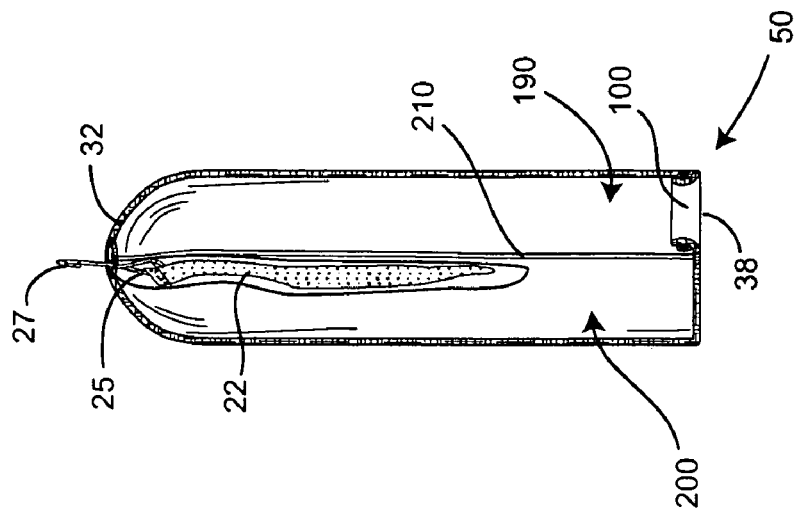
FIG. 5 is an inverted cross-section view of the invention in use as a hamper.

As shown in FIG. 5, a cross-sectional view of the invention in use as a garment bag, the reusable bag 10 may be returned with clean laundry 22 hanging on the laundry hangers 25 inside the enclosure 30. Each hanger 25 traverses the aperture 60 in the closed end 32 of the enclosure 30 (e.g., using a hook portion 27 of the hanger 25 in the exemplary embodiment), while the closed end 32 of the enclosure 30 faces upward in the garment bag configuration 14 for protecting the clean laundry 22 (e.g., from dirt and/or wrinkling).

Returning to FIG. 4, the reusable bag 10 may, in an exemplary embodiment, further include a selectively closable pocket 130 fixed to the enclosure 30. The selectively closable pocket 130 may advantageously be used to store items related to the cleaning of the laundry 20, such as laundry hangers 25, or identification materials to identify the owner of the reusable bag 10, for example. While the selectively closable pocket 130 is fixed to the outside surface 39 of the enclosure 30 in the exemplary embodiment shown in FIG. 4, it may also clearly be located on the inside surface 37 in other embodiments.

The reusable bag 10 may also be used in an exemplary embodiment with the hamper frame 220, which may be selectively attachable proximate the open end 38 of the enclosure 30. The frame 220 may furthermore be adapted to support the enclosure 30 on a ground surface in the hamper configuration 12 with the open end 38 of the bag 10 open. The hamper frame 220 may be a rigid structure that is configured to substantially hold the open end 38 of the bag 10 open so dirty laundry 21 may be more easily inserted into the enclosure 30. The hamper frame 220 may be selectively attachable to the open end 38 by any suitable means of attachment to the reusable bag 10 (e.g., by using one or more clips, a rigid lip having a closed shape over which the open end 38 may be placed substantially securely, using a fastening means, etc.). As stated above, hamper frame 220 may enhance the hamper functionality of the hamper configuration 12 by facilitating insertion of dirty laundry 21 into the reusable bag 10.

FIGS. 4 and 5 illustrate an exemplary embodiment of the reusable bag 10 wherein the enclosure 30 is divided into a dirty laundry compartment 190 and a clean laundry compartment 200 by a central sheet 210 of the flexible web material 40 sewn to each gusset sheet 180. The dirty laundry compartment 190 may include the hem 100 and the closure means 50 in the exemplary embodiment, which may facilitate its use in the hamper configuration 12. The clean laundry compartment 200 may be closed at both ends and may include a zipper 150 in the peripheral edge 35 thereof adapted to facilitate insertion of clean laundry 22 into the clean laundry enclosure 200 when the bag 10 is in the garment bag configuration 14 (e.g., see FIG. 2). Such an embodiment may advantageously prevent clean clothes 22 from coming into contact with dirt from dirty clothes 21 by maintaining each in separate compartments as shown.

While a particular form of the invention has been illustrated and described, it will be apparent that various modifications can be made without departing from the spirit and scope of the invention. For example, as noted above, the at least one handle strap 90 may be located on the front sheet 160 instead of the rear sheet 170 as shown in FIG. 3. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A reusable bag for laundry and laundry hangers, comprising:
   an enclosure made from a flexible web material and having an open end and a closed end, the open end having a closure means, the closed end including an aperture adapted to receive a portion of each laundry hanger therethrough, the enclosure including an inside surface and an outside surface;
   at least one shoulder strap for facilitating carrying of the bag, the shoulder strap fixed at one end of the outside surface of the bag, proximate the closed end of the enclosure, and at another end to the outside surface of the bag, proximate the open end of the enclosure; and
   a handle strap affixed on a back sheet of the bag, proximate the open end, running substantially parallel to the opening, the handle strap centrally disposed between sides of the back sheet;
   the shoulder strap at least partially overlaps the handle strap
   whereby with the open end of the enclosure facing upward in a hamper configuration, dirty laundry may be collected and, when the bag is full, the open end of the enclosure may be selectively closed with the closure means, transported to a laundry cleaning facility by carrying with the at least one handle strap, and returned with clean laundry hanging on the laundry hangers inside the enclosure, each hanger traversing the aperture in the closed end of the enclosure, the closed end of the enclosure facing upward in a garment bag configuration for protecting the clean laundry.

2. The reusable bag of claim 1 further including a selectively closable pocket fixed to the enclosure.

3. The reusable bag of claim 2 wherein the pocket is fixed to the outside surface of the enclosure.

4. The reusable bag of claim 1 wherein the closure means includes a hem around the open end of the enclosure through which a selectively cinchable drawstring is slidably enclosed.

5. The reusable bag of claim 1 further comprising wherein the at least one handle strap includes a pair of handle straps, one each proximate the closed and open ends of the enclosure.

6. The reusable bag of claim 1 wherein the enclosure further includes a peripheral edge portion that includes a zipper adapted to facilitate insertion of clean laundry into the enclosure when the bag is in the garment bag configuration.

7. The reusable bag of claim 1 wherein the enclosure comprises a front sheet of the flexible web material and a back sheet of the flexible web material, each sheet at least partially sewn together along a peripheral edge thereof.

8. The reusable bag of claim 1 wherein the enclosure comprises a front sheet of the flexible web material, a back sheet of the flexible web material, and a gusset sheet of the flexible web material, a peripheral edge of the gusset sheet sewn at least partially to each of the front and back sheets to form the enclosure, the gusset sheet forming a peripheral edge thereof.

9. The reusable bag of claim 8 wherein the enclosure is divided into a dirty laundry compartment and a clean laundry compartment by a central sheet of the flexible web material sewn to the gusset sheet, the dirty laundry compartment including the hem and the closure means, the clean laundry compartment closed at both ends and including a zipper in the peripheral edge thereof adapted to facilitate insertion of clean laundry into the clean laundry enclosure when the bag is in the garment bag configuration.

10. The reusable bag of claim 1 further including a hamper frame selectively attachable proximate the open end of the enclosure, the frame adapted to support the enclosure on a ground surface in the hamper configuration with the open end of the bag open.

11. The reusable bag of claim 1 wherein the flexible web material is a water resistant, air permeable material.

12. The reusable bag of claim 1 further including a laundry hanger retaining means fixed to the inside surface of the enclosure.

13. The reusable bag of claim 12 wherein the laundry hanger retaining means is a strap fixed, at either end thereof to the inside surface of the enclosure, whereby a plurality of the hangers may be looped around the strap for retention thereof inside the enclosure.

14. A reusable bag for laundry and laundry hangers, comprising:
   an enclosure made from a flexible web material and having an open end and a closed end, the open end having a closure means, the closed end including an aperture adapted to receive a portion of each laundry hanger therethrough, the enclosure including an inside surface and an outside surface;
   at least one shoulder strap for facilitating carrying of the bag, the shoulder strap fixed at one end of the outside surface of the bag, proximate the closed end of the enclosure, and at another end to the outside surface of the bag, proximate the open end of the enclosure; and
   at least one handle strap affixed on a back sheet of the bag, proximate the open end, running substantially parallel to the opening, the handle strap centrally disposed between sides of the back sheet;
   the shoulder strap at least partially overlaps the handle strap
   a selectively closable pocket fixed to an outside surface of the enclosure, whereby with the open end of the enclosure facing upward in a hamper configuration, dirty laundry may be collected and, when the bag is full, the open end of the enclosure may be selectively closed with the closure means, transported to a laundry cleaning facility by carrying with the at least one handle strap, and returned with clean laundry hanging on the laundry hangers inside the enclosure, each hanger traversing the aperture in the closed end of the enclosure, the closed end of the enclosure facing upward in a garment bag configuration for protecting the clean laundry.

15. The reusable bag of claim 14 wherein the at least one handle strap includes a pair of handle straps, one each proximate the closed and open ends of the enclosure.

16. A reusable bag for laundry and laundry hangers, comprising:
   an enclosure made from a flexible web material and having an open end and a closed end, the open end having a closure means, the closed end including an aperture adapted to receive a portion of each laundry hanger therethrough, the enclosure including an inside surface and an outside surface;
   at least one shoulder strap for facilitating carrying of the bag, the shoulder strap fixed centrally at one end of the outside surface of the bag, proximate the closed end of the enclosure, and centrally at another end to the outside surface of the bag, proximate the open end of the enclosure;
   first and second handle straps for facilitating carrying of the bag, the first handle strap disposed proximate the open end, running substantially parallel to the opening, the first handle strap centrally disposed between sides of the back sheet; and
   the shoulder strap at least partially overlaps one of the first and second handle straps
   a selectively closable pocket fixed to an outside surface of the enclosure,
   whereby with the open end of the enclosure facing upward in a hamper configuration, dirty laundry may be collected and, when the bag is full, the open end of the enclosure may be selectively closed with the closure means, transported to a laundry cleaning facility by carrying with the at least one handle strap, and returned with clean laundry hanging on the laundry hangers inside the enclosure, each hanger traversing the aperture in the closed end of the enclosure, the closed end of the enclosure facing upward in a garment bag configuration for protecting the clean laundry.

17. The reusable bag of claim 16 wherein the second handle strap is disposed proximate the closed end of the enclosure.

18. The reusable bag of claim 16 wherein the enclosure comprises a front sheet of the flexible web material, a back sheet of the flexible web material, and a gusset sheet of the flexible web material, a peripheral edge of the gusset sheet sewn at least partially to each of the front and back sheets to form the enclosure, the gusset sheet forming a peripheral edge thereof.

* * * * *